(12) United States Patent
Matsumoto et al.

(10) Patent No.: US 7,839,763 B2
(45) Date of Patent: Nov. 23, 2010

(54) RADIO TRANSMISSION DEVICE, RADIO RECEPTION DEVICE, RADIO TRANSMISSION METHOD, AND RADIO RECEPTION METHOD

(75) Inventors: Atsushi Matsumoto, Ishikawa (JP); Daichi Imamura, Kanagawa (JP); Sadaki Futagi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 12/066,781

(22) PCT Filed: Sep. 15, 2006

(86) PCT No.: PCT/JP2006/318415

§ 371 (c)(1), (2), (4) Date: Mar. 13, 2008

(87) PCT Pub. No.: WO2007/032491

PCT Pub. Date: Mar. 22, 2007

(65) Prior Publication Data

US 2009/0225647 A1 Sep. 10, 2009

(30) Foreign Application Priority Data

Sep. 16, 2005 (JP) .............................. 2005-269803

(51) Int. Cl.
*H04J 11/00* (2006.01)
(52) U.S. Cl. ........................................ 370/210; 375/229
(58) Field of Classification Search ................ 370/210; 375/229

See application file for complete search history.

(56) References Cited

U.S. PATENT DOCUMENTS

| 6,529,472 | B1 | 3/2003 | Kaneko |
| 6,726,297 | B1 | 4/2004 | Uesugi |
| 7,418,042 | B2 * | 8/2008 | Choi et al. ................... 375/260 |
| 7,580,490 | B2 * | 8/2009 | Suh et al. ..................... 375/349 |
| 7,613,104 | B2 * | 11/2009 | Bhatt et al. ................... 370/208 |

(Continued)

FOREIGN PATENT DOCUMENTS

| JP | 11-346203 | 12/1999 |
| JP | 2000-115115 | 4/2000 |
| JP | 2005-117581 | 4/2005 |
| JP | 2005-252886 | 9/2005 |

OTHER PUBLICATIONS

L Medina, et al., "Proposal of OFDM System with Data Repetition," Proceeding of IEEE Vehicular Technology Conference 2000, vol. 1, Sep. 24-28, 2000, pp. 352-357.

*Primary Examiner*—Andrew Lee
(74) *Attorney, Agent, or Firm*—Dickinson Wright PLLC

(57) ABSTRACT

Disclosed is a radio transmission device for lightening the waveform distortion of a received signal in a single-carrier transmission irrespective of a fading state. In this device, an FFT unit (103) converts a modulation signal outputted from a modulation unit (102), into a signal of a frequency range, and a repetition unit (104) repeats the frequency range signal outputted from the FFT unit (103), and arranges a plurality of frequency range signals adjacent to each other on a frequency axis. A tooth-shaped waveform forming unit (105) shapes the waveform of the frequency range signals outputted from the repetition unit (104), into a tooth-shaped waveform, and an IFFT unit (106) converts the frequency range signal outputted from the tooth-shaped waveform forming unit (105), into a signal of a time range.

11 Claims, 15 Drawing Sheets

U.S. PATENT DOCUMENTS

| | | |
|---|---|---|
| 2002/0181509 A1* | 12/2002 | Mody et al. ................. 370/480 |
| 2003/0169824 A1* | 9/2003 | Chayat ....................... 375/260 |
| 2005/0276242 A1 | 12/2005 | Goto |
| 2007/0053449 A1 | 3/2007 | Adachi |
| 2007/0058081 A1* | 3/2007 | Kim et al. ................... 348/607 |
| 2008/0186843 A1* | 8/2008 | Ma et al. ..................... 370/210 |

* cited by examiner

RADIO TRANSMISSION DEVICE, RADIO RECEPTION DEVICE, RADIO TRANSMISSION METHOD, AND RADIO RECEPTION METHOD

TECHNICAL FIELD

The present invention relates to a wireless transmitting apparatus, wireless receiving apparatus, wireless transmission method and wireless reception method for performing single carrier transmission.

BACKGROUND ART

In 3GPP RAN LTE (3rd Generation Partnership Project Radio Access Network Long Term Evolution), single carrier transmission of low PAPR (Peak to Average Power Ratio) has been studied as one of uplink transmission schemes.

In single carrier transmission schemes, as a method of improving frequency diversity effect, DFT-spread-OFDM (Discrete Fourier Transform-spread-Orthogonal Frequency Division Multiplex) scheme is disclosed in Patent Document 1. As shown in FIG. 1, in DFT-spread-OFDM, symbol data is subjected to FFT (Fast Fourier Transform) processing, and "0" is inserted into output data from the FFT processing section, so that the frequency band for use is expanded. That is, the frequency band for transmission becomes wider, and, consequently, frequency diversity effect is improved.

FIG. 2 shows the transmission spectrum and level variations in frequency selective channels in single carrier transmission disclosed in Patent Document 1. In a radio channel, the transmission spectrum shown in FIG. 2 is influenced by frequency selective fading as shown in the figure. That is, specific frequency components in the received signal are deteriorated. In the receiving side, waveform distortion due to frequency selective fading is reduced by frequency domain equalization techniques, for example.

Patent Document 1: Japanese Patent Application Laid-Open No. 2005-117581

DISCLOSURE OF INVENTION

Problems to be Solved by the Invention

However, unlike multicarrier transmission, in single carrier transmission, even if only a part of a transmitted frequency spectrum is distorted, its influence expands over the whole of the time-domain waveform of the received signal. Particularly, depending on conditions of fading (including deterioration), there are cases where equalization is not sufficient according to noise enhancement, for example. Consequently, if frequency domain equalization is not sufficient, distortion extends over the whole of the received waveform, and so reception characteristics degrade significantly.

It is therefore an object of the present invention to provide a wireless transmitting apparatus, wireless receiving apparatus, wireless transmission method and wireless reception method, in single carrier transmission, for reducing waveform distortion of a received signal regardless of conditions of fading.

Means for Solving the Problem

The wireless transmitting apparatus of the present invention adopts a configuration including: a converting section that converts a time domain signal into a frequency domain signal; a repetition section that performs repetition, in the frequency domain, of the frequency domain signal converted by the converting section; an inverting section that inverts a plurality of frequency domain signals into a time domain signal; and a transmitting section that transmits the time domain signal inverted by the inverting section.

The wireless receiving apparatus of the present invention adopts a configuration including: a receiving section that receives a time domain signal to which a frequency domain signal is repeated in a frequency domain and a plurality of frequency domain signals are inverted; a converting section that converts the time domain signal into a frequency domain signal; a dividing section that divides a plurality of frequency domain signals converted by the converting section, into separate frequency domain signals; an equalizing section that performs frequency domain equalization on the frequency domain signals divided by the dividing section; a combining section that combines the frequency domain signals subjected to frequency domain equalization by the equalizing section; an inverting section that inverts the combined frequency domain signal into a time domain signal; and a demodulating section that demodulates the signal inverted by the inverting section.

Advantageous Effect of the Invention

According to the present invention, waveform distortion of a received signal can be reduced regardless of conditions of fading in single carrier transmission.

BEST MODE FOR CARRYING OUT THE INVENTION

Figure 1:
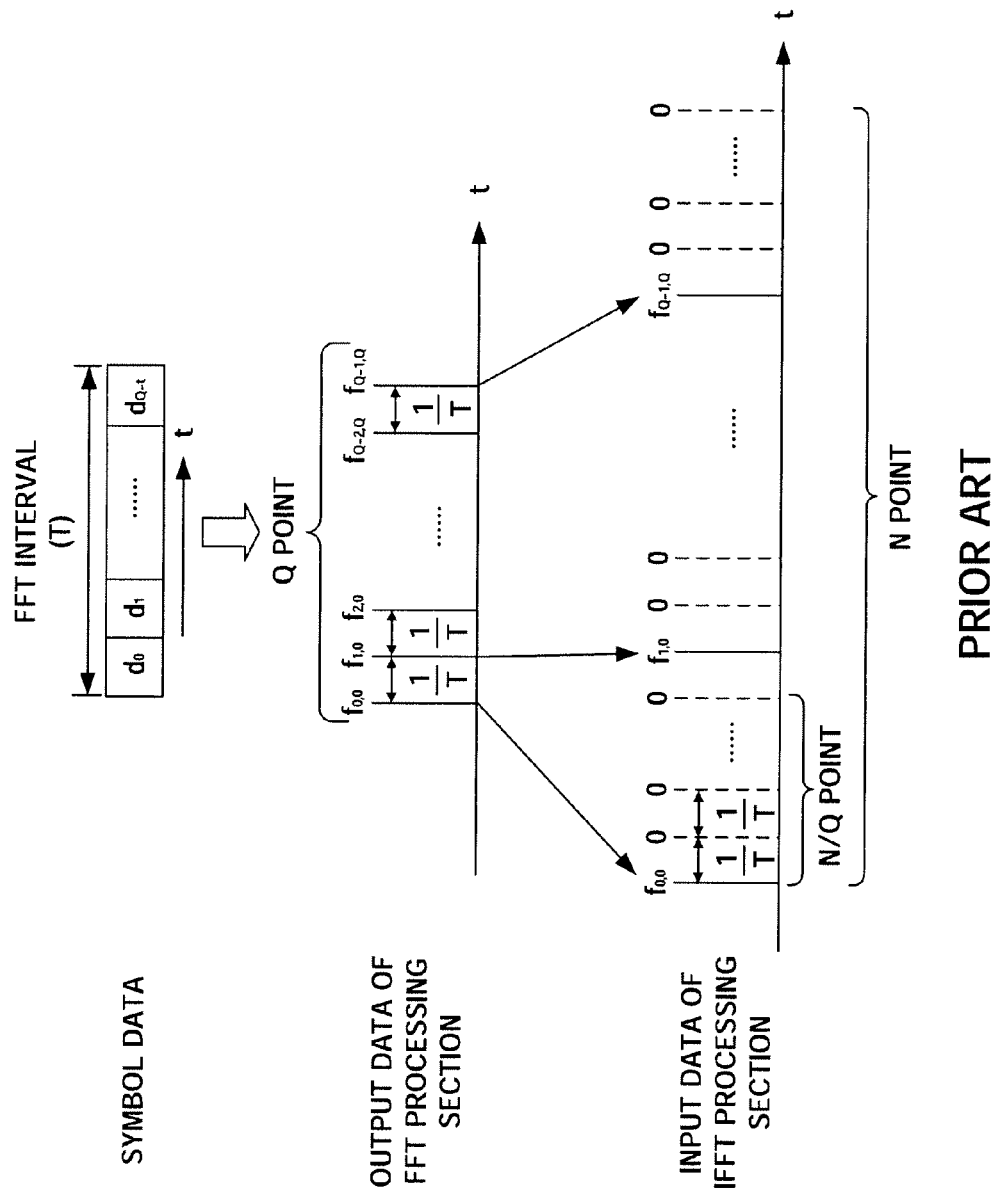
FIG. 1 illustrates a configuration of DFT-spread-OFDM disclosed in Patent Document 1.
Figure 2:
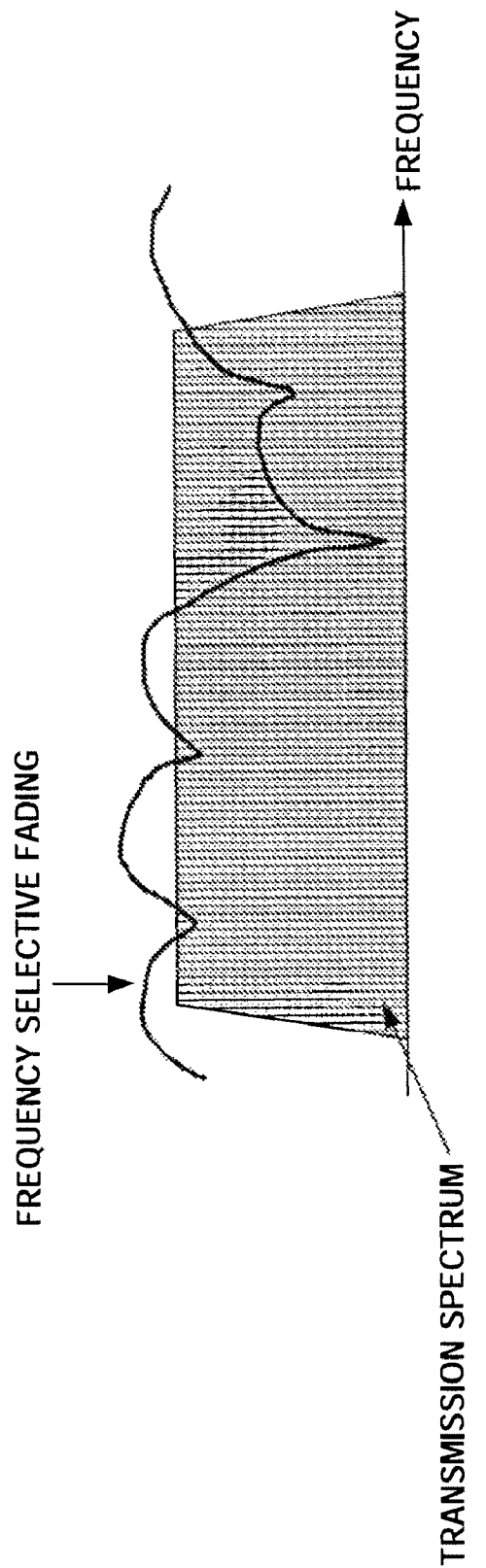
FIG. 2 illustrates the transmission spectrum and level variations in a frequency selective channel in single carrier transmission disclosed in Patent Document 1.

Embodiments of the present invention will be explained below in detail with reference to the accompanying drawings. Further, in the embodiments, the same components having the same functions will be assigned the same reference numerals, and overlapping descriptions will be omitted.

Embodiment 1

Figure 3:
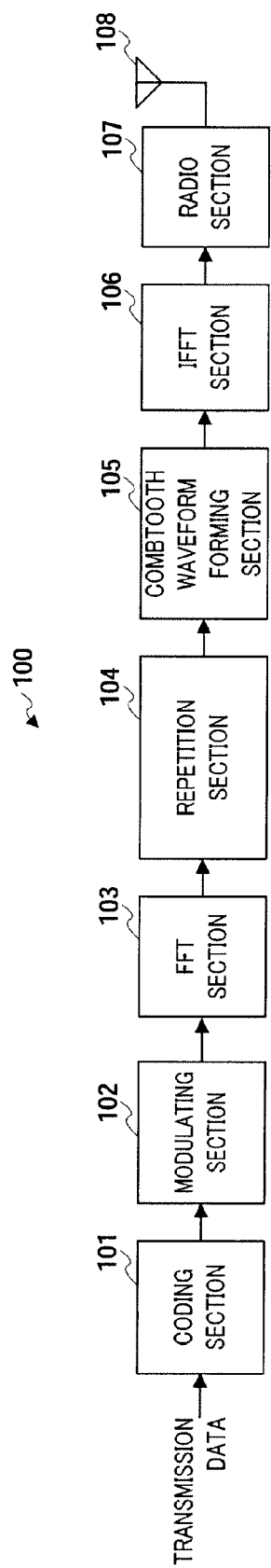
FIG. 3 is a block diagram showing a configuration of the wireless transmitting apparatus according to Embodiment 1 of the present invention.

FIG. 3 is a block diagram showing a configuration of wireless transmitting apparatus 100 according to Embodiment 1 of the present invention. In this figure, coding section 101 applies encoding processing to transmission data as inputted, and outputs the encoded data to modulating section 102. Modulating section 102 applies modulating processing to the encoded data outputted from coding section 101 and outputs the modulated signal to FFT (Fast Fourier Transform) section 103.

FFT section 103 applies FFT processing to the modulated signal outputted from modulating section 102, converts the time domain signal into a frequency domain signal and outputs the frequency domain signal to repetition section 104.

Repetition section 104 repeats (i.e. copies) the frequency domain signal outputted from FFT section 103 and maps a plurality of frequency domain signals neighboring each other onto the frequency domain. A plurality of frequency domain signals mapped neighboring each other in the frequency domain are outputted to combtooth waveform forming section 105. Repetition section 104 will be explained in detail later.

Combtooth waveform forming section 105 forms a plurality of frequency domain signals outputted from repetition section 104 in combtooth waveforms, and outputs the frequency domain signals formed into combtooth waveforms, to IFFT (Inverse Fast Fourier Transform) section 106. Combtooth waveform forming section 105 will be explained in detail later.

IFFT section 106 applies IFFT processing to the frequency domain signal outputted from combtooth waveform forming section 105, converts the frequency domain signal into a time domain signal and outputs the time domain signal to radio section 107.

Radio section 107 applies predetermined radio transmission processing including up-conversion and power amplification to the signal outputted from IFFT section 106, and transmits the signal after radio transmission processing via antenna 108 to a wireless receiving apparatus (not shown) as a communicating party.

Figure 4A:
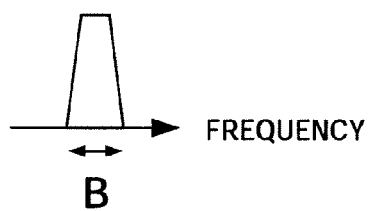
FIG. 4A illustrates the frequency components of the output waveform of the FFT section shown in FIG. 3.
Figure 4B:
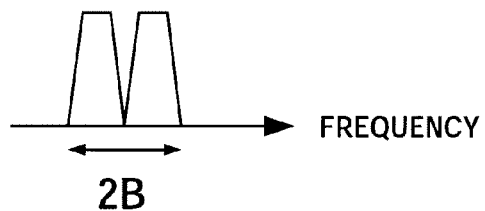
FIG. 4B illustrates the frequency components of the output waveform of the repetition section shown in FIG. 3.
Figure 5:
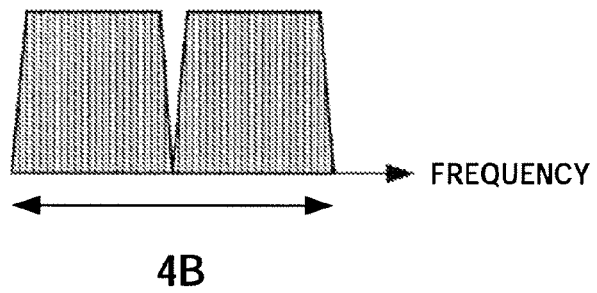
FIG. 5 illustrates the operations of the combtooth waveform forming section shown in FIG. 3.

Next, the operations of repetition section 104 will be explained. Repetition section 104 repeats frequency components outputted from FFT section 103, and maps a plurality of frequency components neighboring each other in the frequency domain. For example, if the frequency components (in bandwidth B [Hz]) of the output waveform of FFT section 103 shown in FIG. 4A, are $\{F_1, F_2, \ldots, \text{and } F_N\}$, the frequency components (in bandwidth B×2 [Hz]) of the output waveform of repetition section 104 shown in FIG. 4B are $\{F_1, F_2, \ldots, F_N, F_1, F_2 \ldots, \text{and } F_N\}$ Next, the operations of combtooth waveform forming section 105 will be explained. Combtooth waveform forming section 105, as shown in FIG. 5, inserts "0" between frequency component samples of a plurality of frequency domain signals outputted from repetition section 104 and forms a combtooth waveform. For example, as explained above, when the frequency components of the output waveform of repetition section 104 shown in FIG. 4B are $\{F_1, F_2, \ldots, F_N, F_1, F_2 \ldots, \text{and } F_N\}$, the frequency components of the output waveform of combtooth waveform forming section 105 are $\{F_1, 0, F_2, 0, \ldots, F_N, 0, F_1, 0, F_2, 0, \ldots F_N, \text{and } 0\}$. Moreover, in this case, the number of frequency component samples equals the number of inserted "0's", so that the bandwidth is double expanded (i.e. bandwidth B×4 [Hz]). In this way, by expanding bandwidth, frequency diversity effect is improved.

Figure 6:
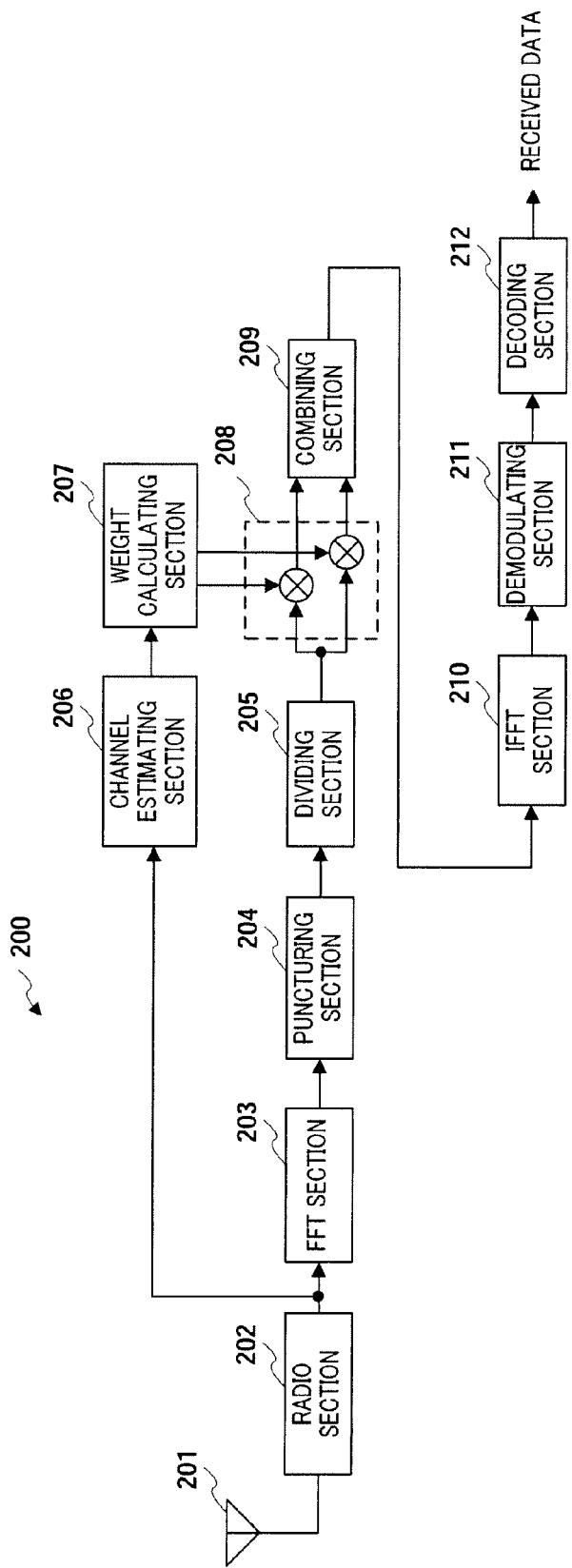
FIG. 6 is a block diagram showing a configuration of the wireless receiving apparatus according to Embodiment 1 of the present invention.

FIG. 6 is a block diagram showing a configuration of wireless receiving apparatus 200 according to Embodiment 1 of the present invention. In this figure, radio section 202 receives a signal transmitted from wireless transmitting apparatus 100 shown in FIG. 3 via antenna 201, applies predetermined receiving processing including down-conversion to the received signal, and outputs the signal after radio receiving processing to FFT section 203. Moreover, radio section 202 outputs the received pilot signals after radio receiving processing to channel estimating section 206.

FFT section 203 applies FFT processing to the signal outputted from radio section 202, converts the time domain signal into a frequency domain signal and outputs the frequency domain signal to puncturing section 204.

Puncturing section 204 punctures the zero components from the combtooth frequency domain signal outputted from FFT section 203 and outputs the frequency domain signal after the zero components are punctured, to dividing section 205.

Dividing section 205 divides, on a per frequency band basis, a plurality of frequency domain signals outputted from puncturing section 204 and mapped in different frequency bands and outputs each divided frequency domain signal to frequency domain equalizing section 208.

Based on the received pilot signal outputted from radio section 202, channel estimating section 206 outputs a channel estimation value acquired by estimating channel response in channels, to weight calculating section 207.

Weight calculating section 207 calculates a weighting coefficient per frequency component sample, using the channel estimation value outputted from channel estimating section 206. At this time, weight calculating section 207 calculates the weight compensating for channel distortion and the weight combined a plurality of frequency components in repetition. The calculated weights are outputted to frequency domain equalizing section 208.

Frequency domain equalizing section 208 performs frequency domain equalization by multiplying each sample of the frequency domain signal in frequency bands outputted from dividing section 205 by the weight outputted from weight calculating section 207. The frequency domain signals after frequency domain equalization on a per frequency band basis are outputted to combining section 209.

Combining section 209 combines the frequency domain signals outputted from frequency domain equalizing section 208 and outputs the combined signal to IFFT section 210. Incidentally, to perform diversity combining of a plurality of frequency domain signals with optimal weights, frequency domain equalization processing and diversity combining processing need to be performed at the same time. Consequently, it is preferable to divide a frequency domain signal into diversity branches before frequency domain equalization processing.

IFFT section 210 applies IFFT processing to the signal outputted from combining section 209, converts the frequency domain signal into a time domain signal, and outputs the time domain signal to demodulating section 211. Demodulating section 211 applies demodulating processing to the signal outputted from IFFT section 210, and outputs the demodulated signal to decoding section 212. Decoding section 212 applies decoding processing to the demodulated signal outputted from demodulating section 211, and outputs received data.

Figure 7:
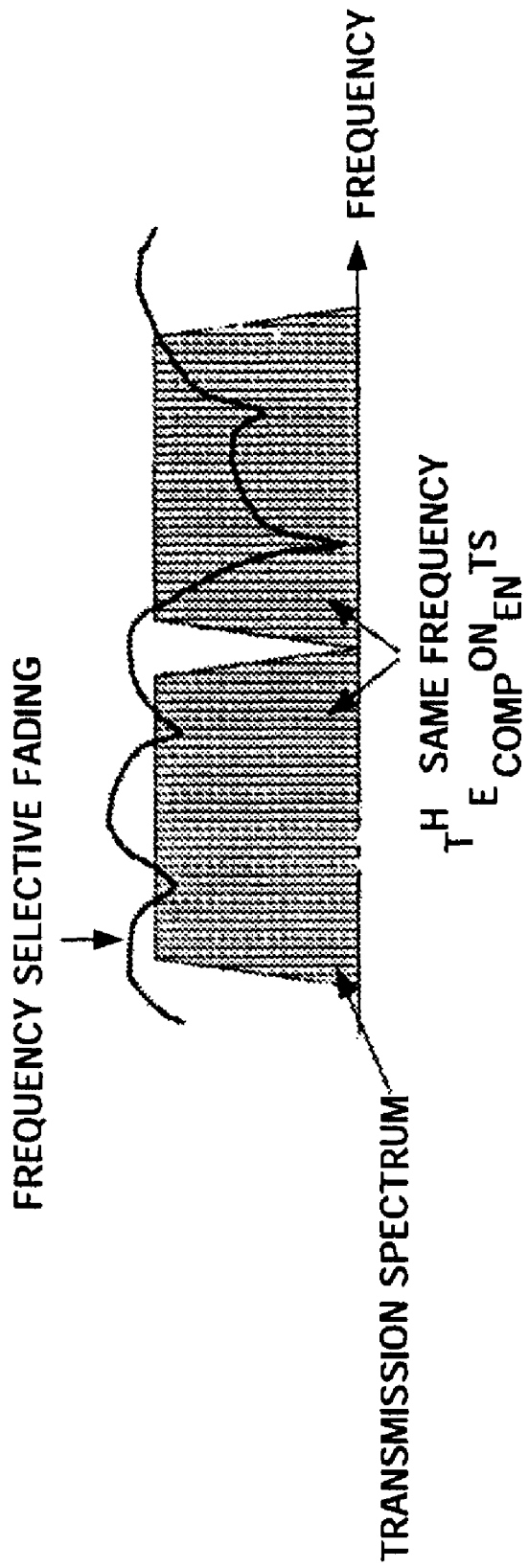
FIG. 7 illustrates the spectrum transmitted from the wireless transmitting apparatus and level variations in a frequency selective channel, shown in FIG. 3.

Here, FIG. 7 shows a spectrum transmitted from wireless transmitting apparatus 100 shown in FIG. 3 and level variations in the frequency selective channel. As explained above, the transmission spectrum shown in this figure is subjected to frequency repetition, and the left half (i.e. low frequency side) of spectrum and the right half (i.e. high frequency side) of spectrum have the same frequency components. This transmission spectrum in radio channels is influenced by frequency selective fading as shown in the figure. That is, in frequency components upon reception, specific frequency components are in deteriorated conditions (i.e. high frequency side in FIG. 7). Wireless receiving apparatus 200 combines (or selects) a plurality of the same spectrums, thereby compensating for deterioration due to frequency selective fading. That is, diversity effect is improved, and waveform distortion of a received signal can be reduced.

In this way, according to Embodiment 1, by transmitting the same spectrum components divided into a plurality of different frequency bands, and by combining or selecting divided and transmitted frequency components in the receiving side, frequency diversity effect is improved, and influence of frequency selective fading can be reduced, so that waveform distortion of a received signal can be reduced.

Moreover, although the present embodiment has been described to provide combtooth waveform forming section 105 in wireless transmitting apparatus 100, the present invention is not limited to this, and combtooth waveform forming section 105 may not be provided.

Moreover, although a case has been explained above with the present embodiment where the repetition in repetition section 104 results in forming two frequency domain signals, the present invention is not limited to this, and two or more frequency domain signals may be formed.

Moreover, although a case has been explained above with the present embodiment where the number of inserted "0"s is the same as the number of samples of frequency components in combtooth waveform forming section 105, those do not necessarily have the same numbers.

Moreover, although a case has been explained above with the present embodiment where, in the frequency domain, a plurality of frequency domain signals are divided into each band, are subjected to frequency domain equalization for each divided band, and then combined, a plurality of frequency domain signals may be all subjected to frequency domain equalization and then combined.

Embodiment 2

Figure 8:
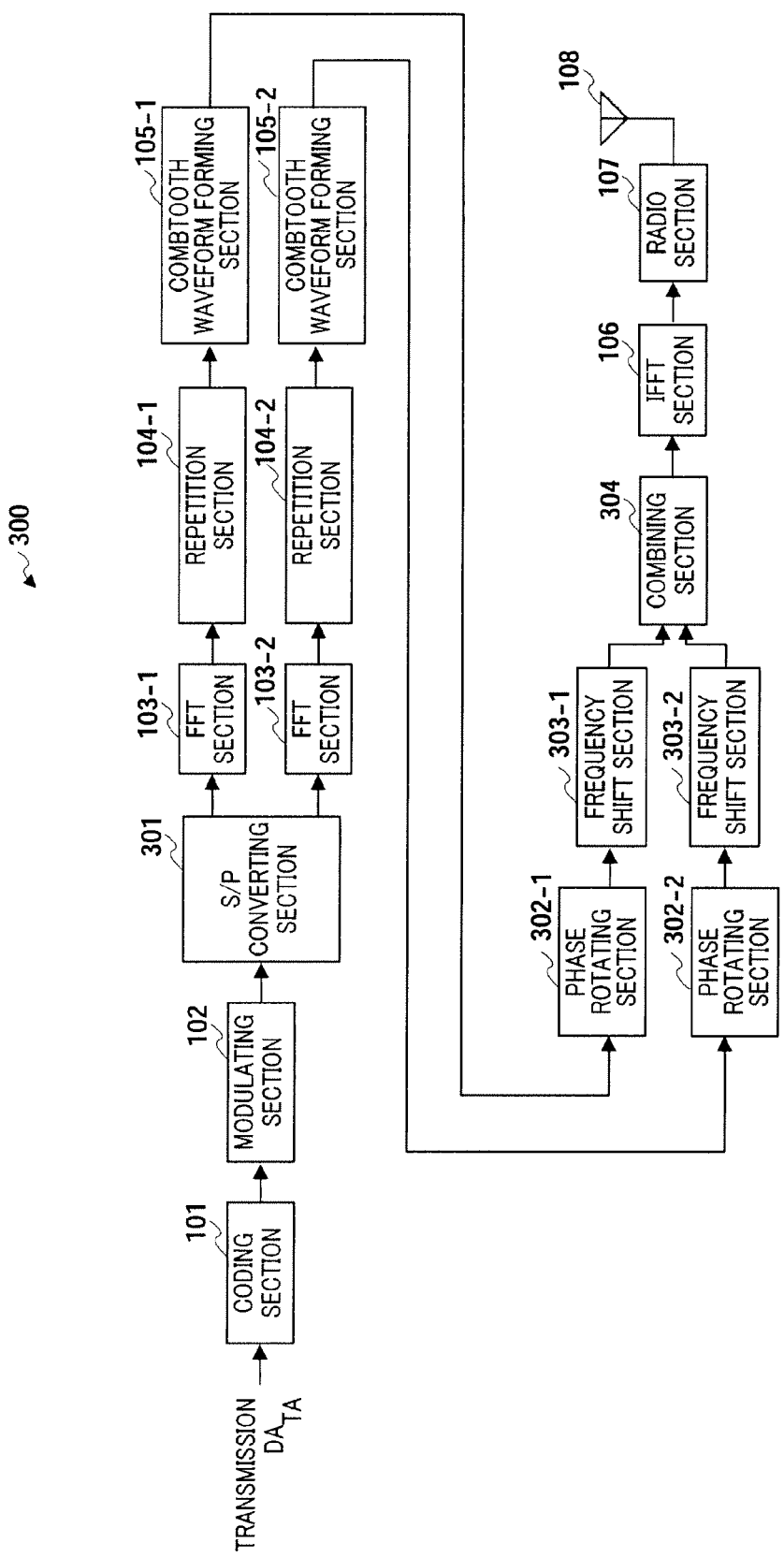
FIG. 8 is a block diagram showing a configuration of the wireless transmitting apparatus according to Embodiment 2 of the present invention.

FIG. 8 is a block diagram showing a configuration of wireless transmitting apparatus 300 according to Embodiment 2 of the present invention. In this figure, S/P converting section 301 divides the signal outputted from modulating section 102 into a plurality of sequences and outputs the divided sequences to FFT section 103-1 and FFT section 103-2.

FFT sections 103-1 and 103-2, repetition sections 104-1 and 104-2, combtooth waveform forming sections 105-1 and 105-2 have the same function of equivalent sections explained in Embodiment 1.

Phase rotating section 302-1 applies specific phase rotation processing to the frequency domain signal outputted from combtooth waveform forming section 105-1 and outputs the phase-rotated frequency domain signal to frequency shift section 303-1.

Frequency shift section 303-1 applies specific frequency shift to the frequency domain signal outputted from phase rotating section 302-1 and outputs the frequency-shifted frequency domain signal to combining section 304.

Phase rotating section 302-2 applies phase rotation processing in a different amount of phase rotation from phase rotation section 302-1, to the frequency domain signal outputted from combtooth waveform forming section 105-2, and outputs the phase-rotated frequency domain signal to frequency shift section 303-2.

Frequency shift section 303-2 applies frequency shift in a different amount of shift from frequency shift section 303-1, and outputs the frequency-shifted frequency domain signal to combining section 304.

Combining section 304 combines the frequency domain signals outputted from frequency shift section 303-1 and frequency shift section 303-2 respectively and outputs the combined signal to IFFT section 106.

Next, the operations of phase rotating sections 302-1 and 302-2 will be explained. Here, the relationship between the amount of time shift $\tau$ in time-domain waveform f(t), and the amount of phase rotation $\exp(-j\omega\tau)$ for frequency component $F(\omega)$ in the frequency domain, is expressed in equation 1 below.

$$f(t-\tau) \Leftrightarrow F(\omega)\exp(-j\omega\tau) \qquad \text{(Equation 1)}$$

Consequently, this relational equation can derive the amount of phase rotations in phase rotating section 302-1 and phase rotating section 302-2.

If the amount of shift for the time-domain waveform in phase rotating section 302-1 is zero and the amount of shift for the time-domain waveform in phase rotating section 302-2 is one sample, the amount of phase rotation $W^1_n$ for each sample n in phase rotating section 302-1 is $W^1_n=1$, n=0, 1, 2, . . . , and 4N−1 and amount of phase rotation $W^2_n$ corresponding to each sample n in phase rotating section 302-2 is $W^2_n=\exp(-j2\pi n/4N)$, n=0, 1, 2, . . . , and 4N−1. N is the number of FFT samples in FFT section 103-1 and FFT section 103-2.

If the output of combtooth waveform forming section 105-1 is $\{F^1_0, 0, F^1_1, 0, \ldots, F^1_{N-1}, 0, F^1_0, 0, F^1_1, 0, \ldots, F^1_{N-1},$ 0} and the output of combtooth waveform forming section 105-2 is $\{F^2_0, 0, F^2_1, 0, \ldots, F^2_{N-1}, 0, F^2_0, 0, F^2_1, 0, \ldots, F^2_{N-1}, 0\}$, the output of phase rotation section 302-1 and phase rotation section 302-2 is $\{F^1_0 W^1_0, 0, F^1_1 W^1_2, 0, \ldots, F^1_{N-1} W^1_{2N-2}, 0, F^1_0 W^1_{2N}, 0, F^1_1 W^1_{2N+2}, 0, \ldots, F^1_{N-1} W^1_{4N-2}, 0\}$ and $\{F^2_0 W^2_0, 0, F^2_1 W^2_2, 0, \ldots, F^2_{N-1} W^2_{2N-2}, 0, F^2_0 W^2_{2N}, 0, F^2_1 W^2_{2N+2}, 0, \ldots, F^2_{N-1} W^2_{4N-2}, 0\}$, respectively.

In this way, by applying a time-domain shift of several samples to a time-domain waveform corresponding to frequency components, phase rotating section 302-2 is able to orthogonal-multiplex a plurality of signals in the time domain.

Figure 9A:
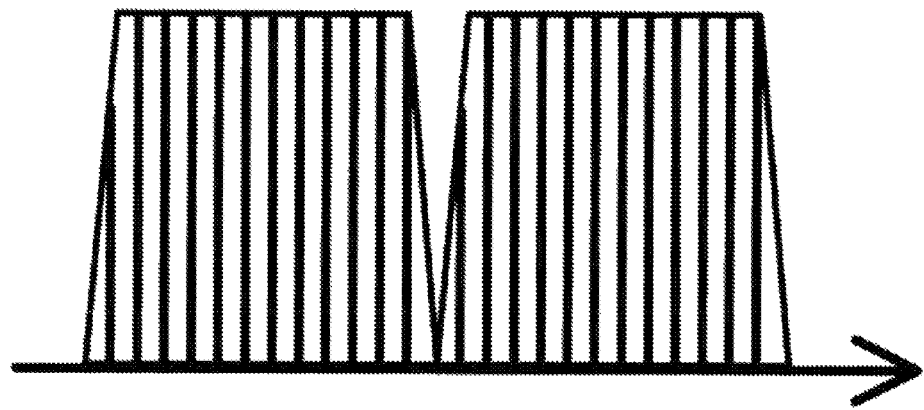
FIG. 9 illustrates the operations of the frequency shift section shown in FIG. 8.
Figure 9B:
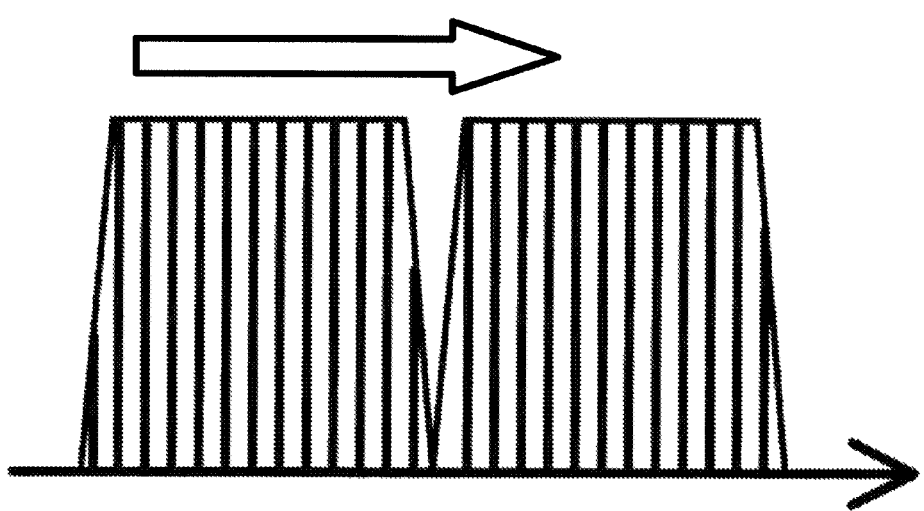

Next, the operations of frequency shift sections 303-1 and 303-2 will be explained. If the amount of shift in frequency shift section 303-1 is zero and the amount of shift in frequency shift section 303-2 is one sample, the output of frequency shift section 303-1 is $\{F^1_0 W^1_0, 0, F^1_1 W^1_2, 0, \ldots, F^1_{N-1} W^1_{2N-2}, 0, F^1_0 W^1_{2N}, 0, F^1_1 W^1_{2N+2}, 0, \ldots, F^1_{N-1} W^1_{4N-2},$ and $0\}$ and, as shown in FIGS. 9A and 9B, the output of frequency shift section 303-2, which applies a frequency-shift of one sample is $\{0, F^2_0 W^2_0, 0, F^2_1 W^2_2, 0, \ldots, F^2_{N-1} W^2_{2N-2}, 0, F^2_0 W^2_{2N}, 0, F^2_1 W^2_{2N+2}, 0, \ldots,$ and $F^2_{N-1} W^2_{4N-2}\}$.

In this way, by shifting frequency components in sample units, frequency shift section 303-2 is able to frequency-multiplex a plurality of signals in the frequency domain. That is, combining section 304 multiplexes the two outputs of frequency shift section 303-1 and frequency shift section 303-2 such that frequency component of one output is multiplexed over the zero component of the other output.

Figure 10:
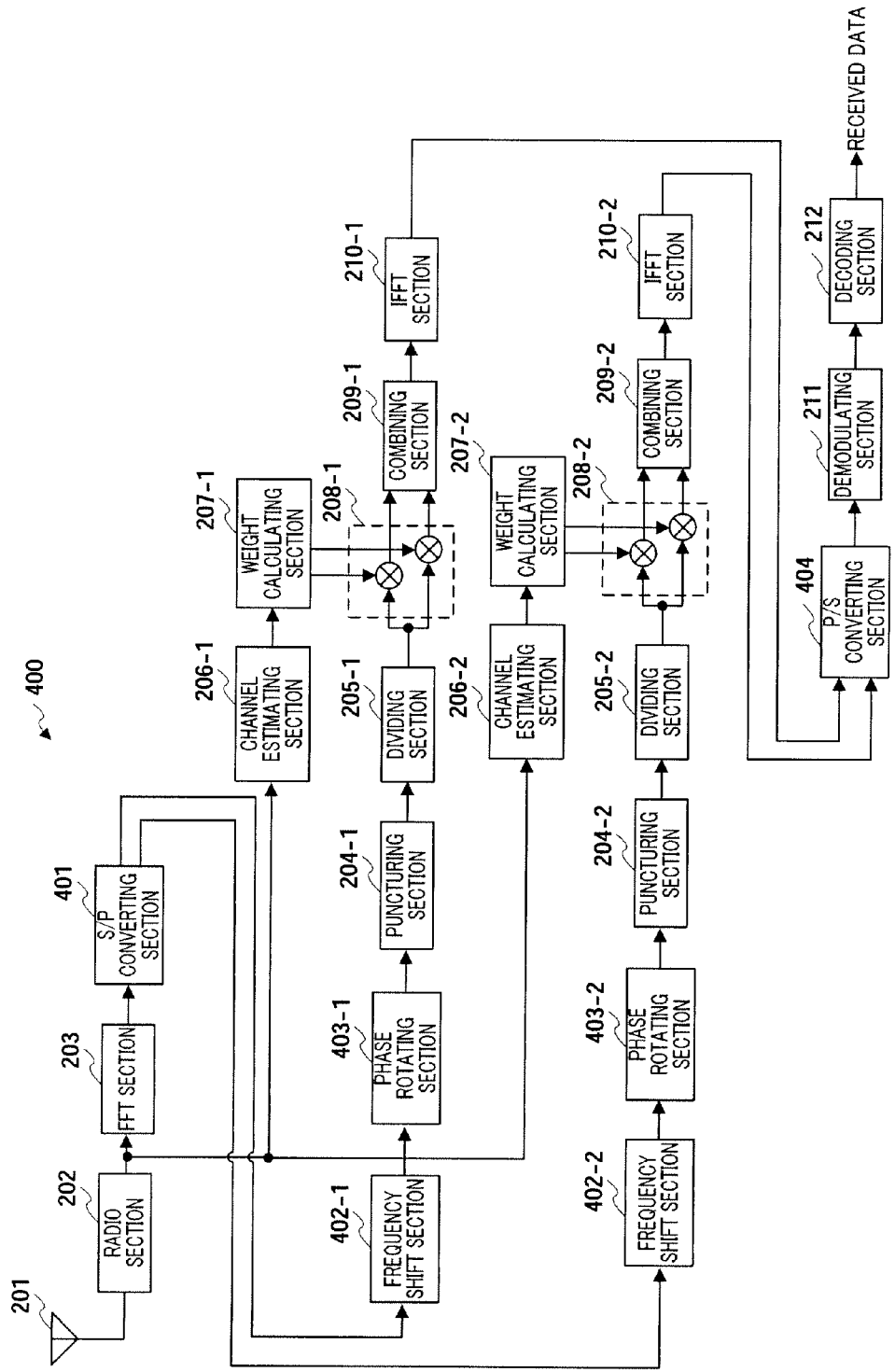
FIG. 10 is a block diagram showing a configuration of the wireless receiving apparatus according to Embodiment 2 of the present invention.

FIG. 10 is a block diagram showing a configuration of wireless receiving apparatus 400 according to Embodiment 2 of the present invention. In this figure, S/P converting section 401 divides the signal outputted from FFT section 203 into a plurality of sequences. By this means, two combtooth sequences multiplexed in the frequency domain are demultiplexed. The divided sequences are outputted to frequency shift section 402-1 and frequency shift section 402-2.

Frequency shift section 402-1 performs frequency shift in the reverse amount of shift in frequency shift section 303-1 shown in FIG. 8 on the signal outputted from S/P converting section 401, and outputs the frequency-shifted signal to phase rotating section 403-1.

Similarly, frequency shift section 402-2 performs frequency shift in the reverse amount of shift in frequency shift section 303-2 shown in FIG. 8 on the signal outputted from S/P converting section 401, and outputs the frequency-shifted signal to phase rotating section 403-2.

Phase rotating section 403-1 performs phase rotation in the reverse amount of shift in phase rotating section 302-1 shown in FIG. 8 on the signal outputted from frequency shift section 402-1, and outputs the phase-rotated signal to puncturing section 204-1.

Equally, phase rotating section 403-2 performs phase rotation in the reverse amount of shift in phase rotating section 302-2 shown in FIG. 8 on the signal outputted from frequency shift section 402-2, and outputs the phase-rotated signal to puncturing section 204-2.

P/S converting section 404 converts the signals outputted from IFFT section 210-1 and IFFT section 210-2 into one sequence and outputs the signal converted into one sequence to demodulating section 211.

Puncturing sections 204-1 and 204-2, dividing sections 205-1 and 205-2, channel estimating sections 206-1 and 206-2, weight calculating sections 207-1 and 207-2, frequency domain equalizing sections 208-1 and 208-2, combining sections 209-1 and 209-2, and IFFT sections 210-1 and 210-2 have the same functions of the corresponding sections explained in Embodiment 1.

Figure 11A:
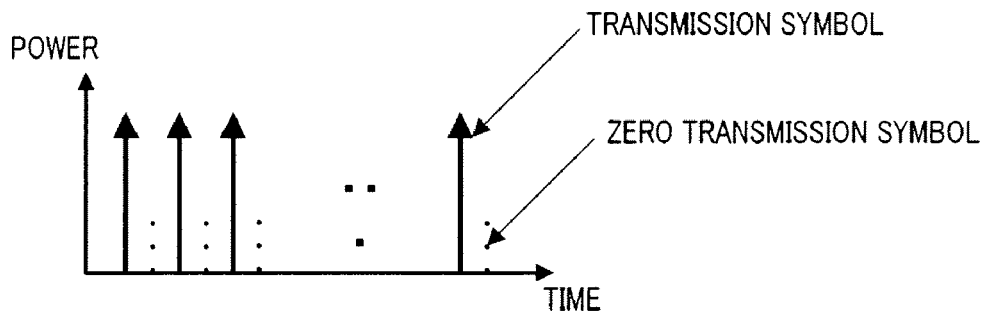
FIG. 11 illustrates the operations of suppression of PAPR increase.
Figure 11B:
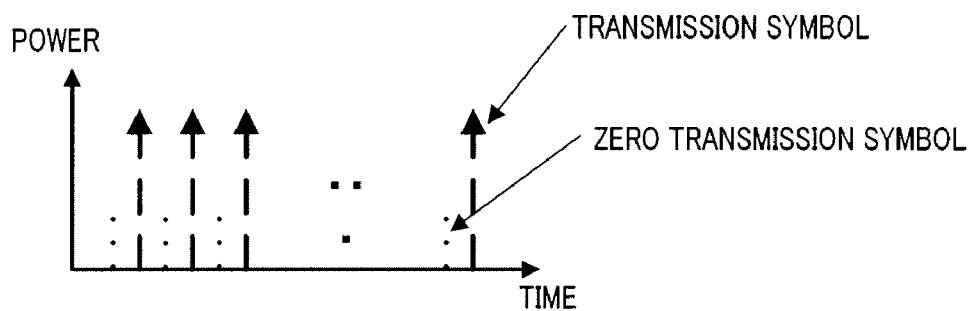

Here, FIGS. 11A and 11B show transmission power at the symbol positions of time-domain waveforms of output components of frequency shift section 303-1 and frequency shift section 303-2. Focusing upon the symbol positions alone, the PAPR (Peak to Average Power Ratio) of these output components is several decibels higher than when frequency repetition is not performed. This is because time-domain waveforms become a combtooth shape through frequency repetition. That is, the number of 0 symbols having the same number of the symbols is inserted. As a result, although frequency diversity effect is improved, average power is decreased, and so, PAPR is increased.

Figure 11C:
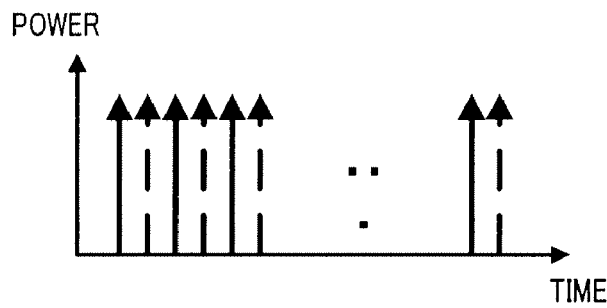

Then, when combining section 304 combines the output component of frequency shift section 303-1 and the output component of frequency shift section 303-2, the time-domain waveform shown in FIG. 11C is produced and this waveform has the same shape of the waveform where frequency repetition is not performed. That is, PAPR increase of a combined signal can be suppressed.

In this way, according to Embodiment 2, a plurality of frequency domain signals having combtooth waveforms are subjected to phase rotation in respectively different amounts of phase rotation and frequency shift in respectively different amounts of frequency shift and multiplexed, so that frequency diversity effect is improved and PAPR increase can be suppressed.

Incidentally, although a case has been explained with the present embodiment here where two frequency domain signals are formed as a result of repetition in repetition sections 104-1 and 104-2, the present invention is not limited to this, and two or more frequency domain signals can be formed.

Moreover, although a case has been explained with the present embodiment here where two sequences are divided in S/P converting section 301 and two sequences of frequency domain signals are multiplexed, that is, the number of multiplexing is two, in combining section 304, the present invention is not limited to this, and the number of divisions in S/P converting section 301 may be two or more and the number of multiplexing in combining section 304 may be two or more.

Moreover, although a case has been explained herewith the present embodiment where a wireless transmitting apparatus provides one coding section and one modulating section, the present invention is not limited to this, and the wireless transmitting apparatus may also provide a plurality of different coding sections and a plurality of different modulating sections and repeat the modulated signals.

Embodiment 3

A case has been explained with Embodiment 2 where, one wireless transmitting apparatus performs a phase rotation and frequency shift on a plurality of different signals, and multiplexes, and a case will be explained with Embodiment 3 of the present invention where, a plurality of wireless transmitting apparatuses perform phase rotation and frequency shift on a per user basis, and user-multiplex.

Figure 12:
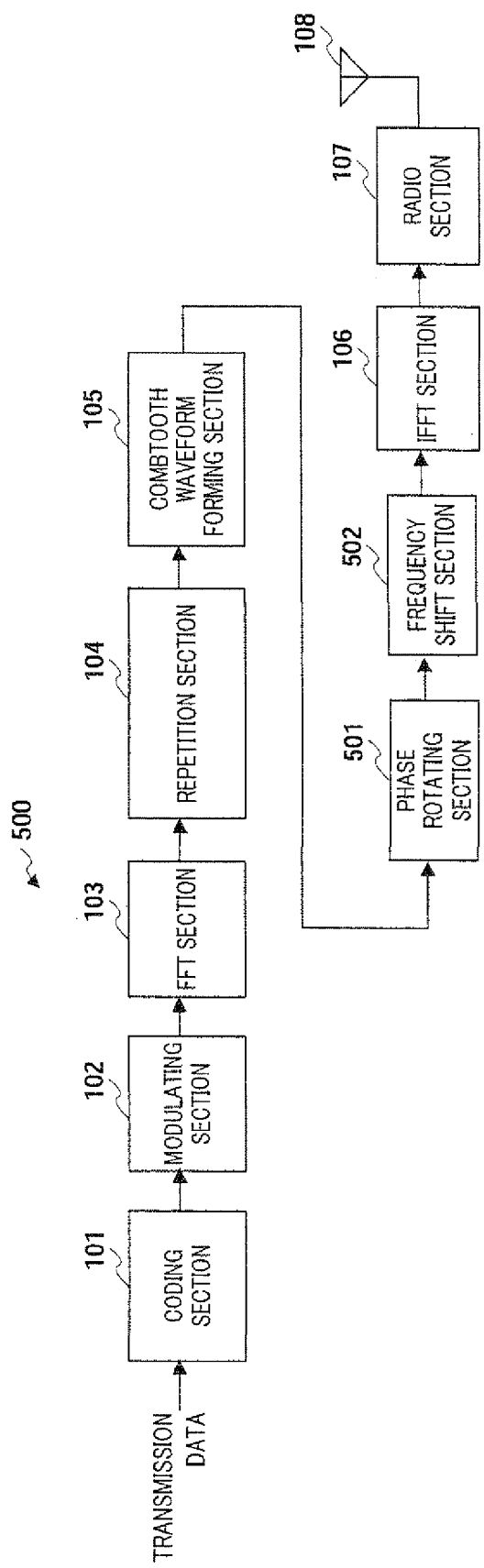
FIG. 12 is a block diagram showing a configuration of the wireless transmitting apparatus according to Embodiment 3 of the present invention.
Figure 13A:
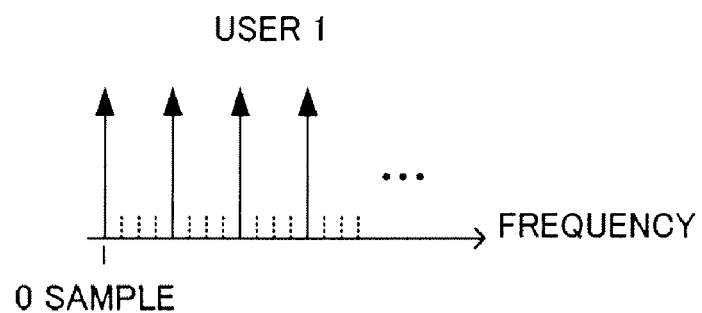
FIG. 13A conceptually illustrates the amount of frequency shift per user shown in table 1.
Figure 13B:
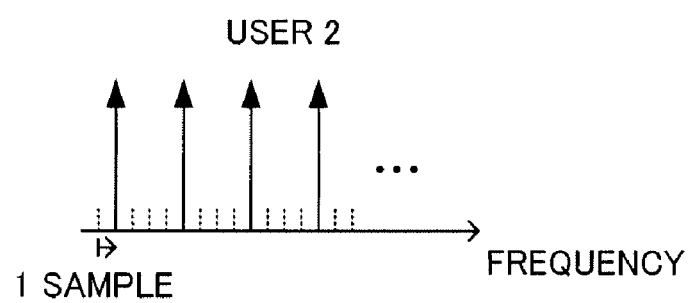
FIG. 13B conceptually illustrates the amount of frequency shift per user shown in table 1.
Figure 13C:
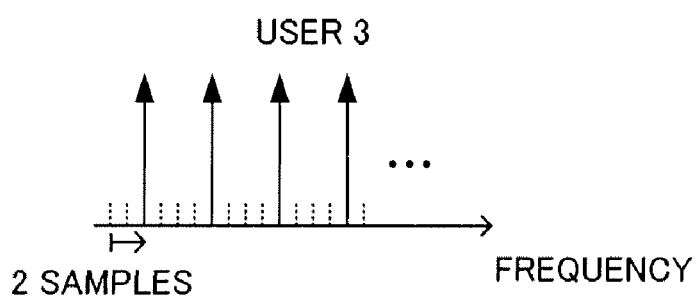
FIG. 13C conceptually illustrates the amount of frequency shift per user shown in table 1.
Figure 13D:
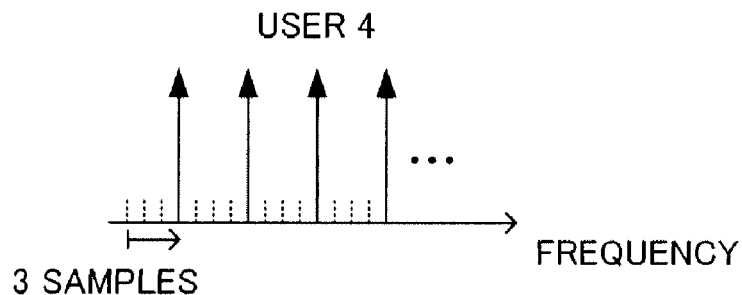
FIG. 13D conceptually illustrates the amount of frequency shift per user shown in table 1.
Figure 14A:
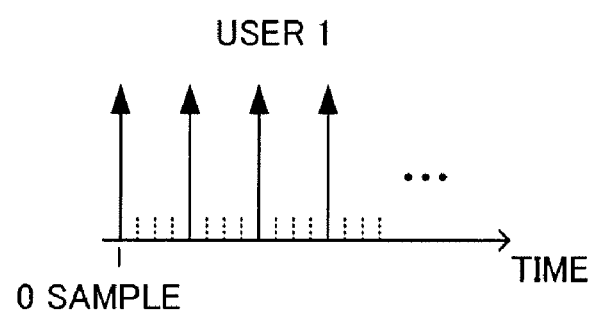
FIG. 14A illustrates that the amount of phase rotation in the frequency domain per user shown in table 1 is converted into an amount of time shift in the time domain.
Figure 14B:
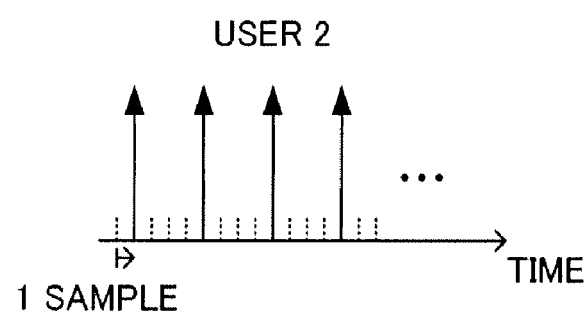
FIG. 14B illustrates that the amount of phase rotation in the frequency domain per user shown in table 1 is converted into the amount of time shift in the time domain.
Figure 14C:
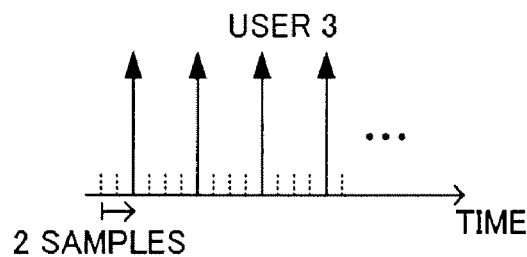
FIG. 14C illustrates that the amount of phase rotation in the frequency domain per user shown in table 1 is converted into the amount of time shift in the time domain.
Figure 14D:
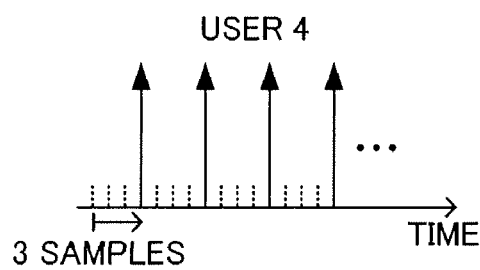
FIG. 14D illustrates that the amount of phase rotation in the frequency domain per user shown in table 1 is converted into the amount of time shift in the time domain.

FIG. 12 is a block diagram showing a configuration of wireless transmitting apparatus 500 according to Embodiment 3 of the present invention. In this figure, phase rotating section 501 applies phase rotation processing in various amounts of phase rotation on a per user basis, to the frequency domain signals outputted from combtooth waveform forming section 105, and outputs the phase-rotated frequency domain signal to frequency shift section 502.

Frequency shift section 502 applies frequency shift in various amounts of frequency shift on a per user basis, to the frequency domain signal outputted from phase rotating section 501, and outputs the frequency-shifted frequency domain signal to IFFT section 106.

Here, table 1 shows the amount of phase rotation in phase rotating section 501 and the amount of frequency shift in frequency shift section 502 in each wireless transmitting apparatus 500 where the number of users is four.

TABLE 1

|  | Amount of frequency shift for each sample | Amount of frequency shift |
|---|---|---|
| User 1 | $w_n^1 = \exp\left(-j2\pi \frac{0 \cdot n}{16N}\right) = 1$ | 0 sample |
| User 2 | $w_n^2 = \exp\left(-j2\pi \frac{n}{16N}\right)$ | 1 sample |
| User 3 | $w_n^3 = \exp\left(-j2\pi \frac{2n}{16N}\right)$ | 2 samples |
| User 4 | $w_n^4 = \exp\left(-j2\pi \frac{3n}{16N}\right)$ | 3 samples |

Here, the number of frequency repetitions is four and the interval between combteeth upon combtooth waveform is four. Moreover, N shows the number of FFT samples and n shows the sample number of a frequency component (i.e. n=0, 1, 2, . . . , and 16N−1).

In this way, this describes that the amount of phase rotation and the amount of frequency shift, which vary on a per user basis, are determined as appropriate as well as resource allocation, and designated for each user by a base station apparatus.

FIG. 13 conceptually shows the amount of frequency shift per user shown in table 1. FIG. 13A shows the amount of frequency shift for user 1, FIG. 13B shows the amount of frequency shift for user 2, FIG. 13C shows the amount of frequency shift for user 3, and FIG. 13D shows the amount of frequency shift for user 4. Additionally, FIGS. 14A to 14D show the amount of phase rotation in the frequency domain per user shown in table 1 is converted into an amount of time shift in the time domain.

Figure 15:
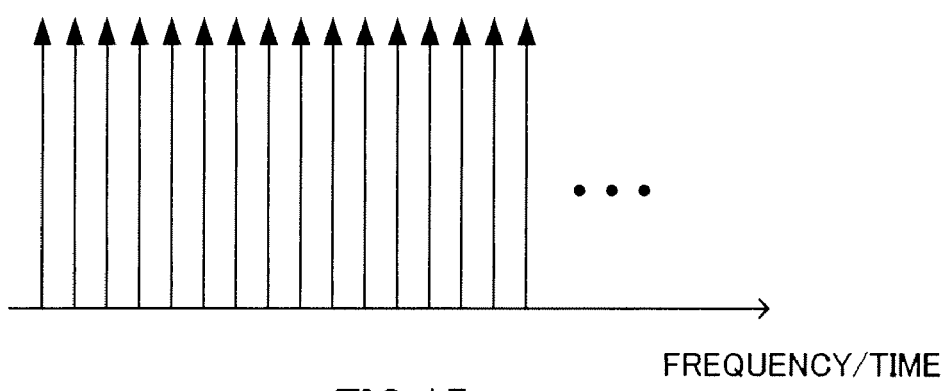
FIG. 15 illustrates the waveform of the user-multiplexed multiplex signal.

As shown in table 1, when the signals for four users subjected to phase rotation and frequency shift in respective amounts of phase rotation and frequency shift on a per user basis, are multiplexed, the multiplexed signal has a waveform shown in FIG. 15.

Figure 16:
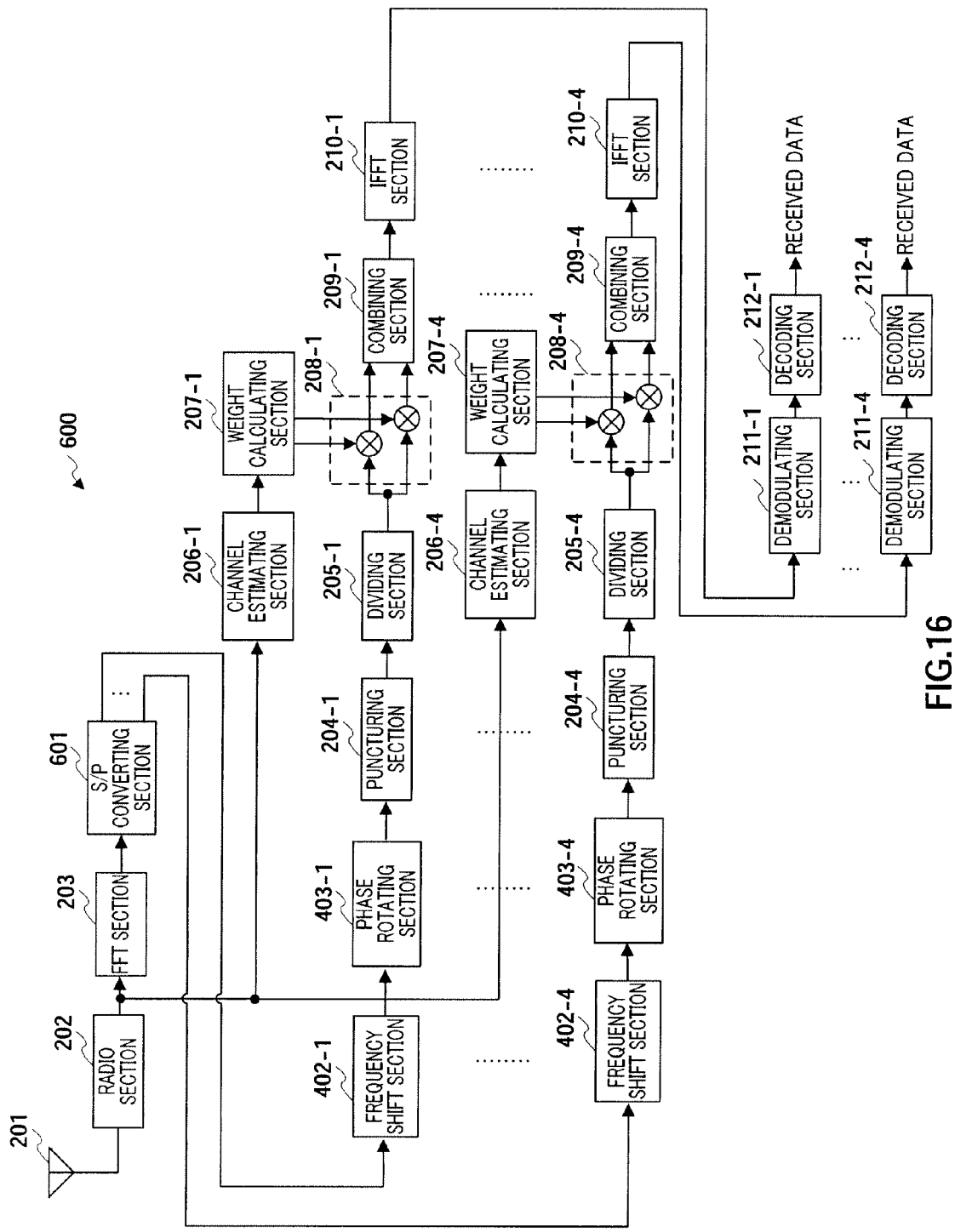
FIG. 16 is a block diagram showing a configuration of the wireless receiving apparatus according to Embodiment 3 of the present invention.

FIG. 16 is a block diagram showing a configuration of wireless receiving apparatus 600 according to Embodiment 3 of the present invention. In this figure, S/P converting section 601 divides the signal outputted from FFT section 203 into four sequences. By this means, the signal is demultiplexed into four, user-specific signals which are user-multiplexed in the frequency domain. The divided signals are outputted to frequency shift sections 402-1 to 402-4.

In processing sections from frequency shift section 402 to decoding section 212 for each signal, processing is applied to the user-specific signal outputted from S/P converting section 601, thereby acquiring the received data per user.

In this way, according to Embodiment 3, by applying a phase rotation and frequency shift which vary on a per user basis, and by user-multiplexing, a plurality of users can improve frequency diversity effect and multiple access is possible, so that system throughput can be improved.

Although a case has been explained with the present embodiment here where the number of users is four, the number of users may also be other than four.

Moreover, although a case has been explained with the present embodiment here where available amounts of phase rotation and available amounts of frequency shift are assigned to respective users, the present invention is not limited to this, and a specific user may be assigned a plurality of amounts of phase rotation and amounts of frequency shift.

Moreover, a case has been explained with the above embodiments where the repetition processing and combtooth waveform forming processing are performed in the frequency domain, they may also be performed in the time domain.

Moreover, although with the above embodiments a case has been explained where the present invention is configured by hardware, the present invention may be implemented by software.

Each function block employed in the description of the above embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-269803, filed on Sep. 16, 2005, the entire content of which is expressly incorporated by reference herein.

INDUSTRIAL APPLICABILITY

The wireless transmitting apparatus, wireless receiving apparatus, wireless transmission method and wireless reception method of the present invention can reduce waveform distortion of a received signal in single carrier transmission regardless of conditions of fading, and are applicable to wireless communication systems for performing single carrier communications.

The invention claimed is:
1. A wireless transmitting apparatus comprising:
 a converting section that converts a time domain signal into a frequency domain signal;
 a repetition section that performs repetition, in the frequency domain, of the frequency domain signal converted by the converting section to generate a repetition signal which contains the repetition of the frequency domain signal;
 an inverting section that inverts the repetition signal into an inverted time domain signal; and
 a transmitting section that transmits the inverted time domain signal inverted by the inverting section.

2. The wireless transmitting apparatus according to claim 1, wherein the repetition section maps a plurality of the frequency domain signals neighboring each other in the frequency domain.

3. The wireless transmitting apparatus according to claim 1, further comprising a waveform forming section that forms frequency components of the repetition signal into a combtooth waveform in which zero components are inserted in between the frequency components of the repetition signal.

4. The wireless transmitting apparatus according to claim 3, further comprising:
a phase rotating section that applies phase rotation to a plurality of the frequency domain signals in the repetition signal; and
a frequency shift section that applies frequency shift to the plurality of phase rotated frequency domain signals in the repetition signal.

5. The wireless transmitting apparatus according to claim 4, further comprising a multiplexing section that multiplexes the plurality of frequency domain signals subjected to the phase rotation in respectively different amounts of the phase rotation by the phase rotating section and subjected to the frequency shift in respectively different amounts of the frequency shift by the frequency shift section.

6. The wireless transmitting apparatus according to claim 4, wherein:
the phase rotating section applies the phase rotation to the plurality of frequency domain signals in respectively different amounts of the phase rotation on a per user basis; and
the frequency shift section applies the frequency shift to the plurality of phase rotated frequency domain signals in respectively different amounts of the frequency shift on the per user basis.

7. A wireless receiving apparatus comprising:
a receiving section that receives a time domain signal generated based on a frequency domain signal which is repeated in a frequency domain, wherein a repetition signal, which contains the repetition of the frequency domain signal, is inverted;
a converting section that converts the time domain signal into the repetition signal;
a dividing section that divides the repetition signal, converted by the converting section, into a plurality of the frequency domain signals;
an equalizing section that performs frequency domain equalization on the plurality of frequency domain signals divided by the dividing section;
a combining section that combines the plurality of frequency domain signals subjected to the frequency domain equalization by the equalizing section to generate a combined frequency domain signal;
an inverting section that inverts the combined frequency domain signal into an inverted time domain signal; and
a demodulating section that demodulates the inverted time domain signal inverted by the inverting section.

8. The wireless receiving apparatus according to claim 7, further comprising a puncturing section that, when the repetition signal has a combtooth waveform in which zero components are inserted in between frequency components of the repetition signal, punctures the inserted zero components.

9. The wireless receiving apparatus according to claim 7, further comprising:
a frequency shift section that, when the plurality of the frequency domain signals in the repetition signal are subjected to phase rotation and frequency shift, performs another frequency shift on the plurality of the frequency domain signals in a reverse amount of shift of an amount of shift applied to the plurality of the frequency domain signals; and
a phase rotating section that performs phase rotation to the plurality of shifted frequency domain signals in a reverse amount of phase rotation of an amount of phase rotation applied to the plurality of the shifted frequency domain signals.

10. A wireless transmission method, comprising the steps of:
converting a time domain signal into a frequency domain signal;
performing repetition, in a frequency domain, of the frequency domain signal to generate a repetition signal which contains the repetition of the frequency domain signal;
inverting the repetition signal into an inverted time domain signal; and
transmitting the inverted time domain signal.

11. A wireless reception method comprising the steps of:
receiving a time domain signal generated based on a frequency domain signal which is repeated in a frequency domain, wherein a repetition signal, which contains the repetition of the frequency domain signal, is inverted;
converting the time domain signal into the repetition signal;
dividing the repetition signal into a plurality of the frequency domain signals;
performing frequency domain equalization on the plurality of frequency domain signals;
combining the plurality of frequency domain signals subjected to frequency domain equalization to generate a combined frequency domain signal;
inverting the combined frequency domain signal into an inverted time domain signal; and
demodulating the inverted time domain signal.

* * * * *